United States Patent
Pomerenke (10) Patent No.: US 9,630,286 B1
(45) Date of Patent: Apr. 25, 2017

(54) TOOL BUDDY

(71) Applicant: Jeff C. Pomerenke, Plymouth, MN (US)

(72) Inventor: Jeff C. Pomerenke, Plymouth, MN (US)

( * ) Notice: Subject to any disclaimer, the term of this patent is extended or adjusted under 35 U.S.C. 154(b) by 95 days.

(21) Appl. No.: 14/708,151

(22) Filed: May 8, 2015

Related U.S. Application Data (60) Provisional application No. 61/991,416, filed on May 9, 2014.

(51) Int. Cl.
   *B23Q 9/02* (2006.01)
   *B25F 5/02* (2006.01)
   *F16M 13/02* (2006.01)

(52) U.S. Cl.
   CPC .............. *B23Q 9/02* (2013.01); *B25F 5/02* (2013.01); *F16M 13/022* (2013.01)

(58) Field of Classification Search
   CPC ........ H01F 7/0252; B25B 11/002; B25H 3/00
   See application file for complete search history.

(56) References Cited

U.S. PATENT DOCUMENTS

| | | | |
|---|---|---|---|
| 1,561,554 A | 11/1925 | Little | |
| 2,268,023 A | 12/1941 | Dunn | |
| 2,594,955 A | 4/1952 | Markowitz | |
| 2,597,601 A | 5/1952 | Sherman | |
| 2,603,530 A | 7/1952 | Jones | |
| 2,641,793 A | 6/1953 | Wilm | |
| 2,702,683 A | 2/1955 | Green et al. | |
| 2,709,245 A | 5/1955 | Schneider | |
| 2,733,113 A | 1/1956 | Humbargar | |
| 2,798,241 A | 7/1957 | Cohen | |
| 2,907,085 A | 10/1959 | Bosland | |
| 2,939,671 A | 6/1960 | Beekman | |
| 2,957,596 A | 10/1960 | Rehborg | |
| 3,046,588 A | 7/1962 | Tobolski et al. | |
| 3,100,275 A | 8/1963 | Gantz | |
| 3,110,917 A | 11/1963 | McPeek, Jr. | |
| 3,159,372 A | 12/1964 | McIntosh | |
| 3,314,634 A | 4/1967 | Carter | |
| 3,713,614 A * | 1/1973 | Taylor | F21L 4/005 248/205.3 |
| 3,729,158 A | 4/1973 | Nagy | |
| 3,886,508 A | 5/1975 | Lavrard | |
| 4,019,047 A | 4/1977 | Frey | |

(Continued)

*Primary Examiner* — Sarah McPartlin
(74) *Attorney, Agent, or Firm* — Albert W. Watkins (57) ABSTRACT

A tool buddy couples to an existing pneumatic tool and allows service personnel to suspend the pneumatic tool from a hoist or other ferromagnetic object. The tool buddy has a molded or otherwise shaped magnet housing that supports, retains, and protects standard magnets therein. The magnet housing defines a tray with side walls and a bottom that receives the magnets therein, but which is open on one face to allow the magnets to effectively engage with a ferromagnetic support. The magnet housing has a generally cylindrically defined concave surface distal to the open face which is cooperative with the curved housing used on most pneumatically or electrically powered tools to nest therewith. To affix the tool buddy to the tool housing, a very high bond double-sided adhesive that adheres on one surface to the magnet housing concave face and on the opposed surface to the tool.

18 Claims, 5 Drawing Sheets

(56) References Cited

U.S. PATENT DOCUMENTS

| | | | |
|---|---|---|---|
| 4,506,317 A | 3/1985 | Duddy | |
| 4,826,059 A | 5/1989 | Bosch et al. | |
| 4,957,266 A | 9/1990 | Ellis | |
| 4,985,817 A | 1/1991 | Yale | |
| 5,000,417 A | 3/1991 | Yamada et al. | |
| 5,031,874 A | 7/1991 | Shannon | |
| 5,039,047 A * | 8/1991 | Pitzo | A47G 1/17 248/206.5 |
| 5,078,281 A | 1/1992 | Johnson | |
| 5,096,154 A | 3/1992 | Ellis | |
| 5,196,818 A * | 3/1993 | Anderson | A45F 5/00 223/109 A |
| 5,224,620 A | 7/1993 | Nyorkor et al. | |
| 5,301,822 A | 4/1994 | Coleman et al. | |
| 5,333,767 A | 8/1994 | Anderson | |
| 5,405,004 A | 4/1995 | Vest et al. | |
| 5,544,747 A | 8/1996 | Horn | |
| 5,568,968 A | 10/1996 | Jaramillo | |
| 5,577,697 A | 11/1996 | Accordino | |
| 5,593,073 A | 1/1997 | Finnegan | |
| 5,699,910 A | 12/1997 | Kubat | |
| 5,760,668 A | 6/1998 | Testa et al. | |
| 5,836,038 A | 11/1998 | Thorp | |
| 6,305,656 B1 | 10/2001 | Wemyss | |
| 6,425,560 B1 | 7/2002 | Dembowiak et al. | |
| 6,467,744 B1 | 10/2002 | Calin | |
| 6,468,614 B1 | 10/2002 | LeVine et al. | |
| 6,488,288 B2 | 12/2002 | Tally | |
| 6,496,094 B2 * | 12/2002 | May, III | B25B 11/002 211/69 |
| 6,530,508 B1 | 3/2003 | Devine | |
| 6,587,022 B1 | 7/2003 | Devine | |
| 6,793,184 B2 | 9/2004 | Dougal et al. | |
| 6,972,654 B1 | 12/2005 | Brock | |
| 7,309,140 B2 | 12/2007 | Huang | |
| 7,338,189 B2 | 3/2008 | Kovacik et al. | |
| D566,061 S * | 4/2008 | Johnson | D13/183 |
| 7,354,023 B1 | 4/2008 | Wappler | |
| 7,431,251 B2 | 10/2008 | Carnevali | |
| 7,510,092 B2 * | 3/2009 | Sholem | B25H 3/04 211/70.6 |
| 7,817,002 B2 | 10/2010 | Fullerton et al. | |
| 8,016,255 B2 | 9/2011 | Lin | |
| 8,398,155 B2 | 3/2013 | Andochick | |
| 8,403,278 B1 | 3/2013 | Kasbohm | |
| 8,505,420 B2 | 8/2013 | Alfaro | |
| 8,516,621 B2 | 8/2013 | Woolery | |
| 8,695,935 B1 * | 4/2014 | Kasbohm | F41A 23/18 211/64 |
| 8,739,453 B1 | 6/2014 | Conner | |
| 8,789,821 B2 | 7/2014 | Wong | |
| 2004/0094686 A1 * | 5/2004 | Hsien | H01Q 1/1228 248/537 |
| 2015/0267847 A1 * | 9/2015 | Smith | B25H 3/00 137/560 |

* cited by examiner

TOOL BUDDY

CROSS REFERENCE TO RELATED APPLICATIONS

The present application claims the benefit of U.S. provisional patent application 61/991,416 filed May 9, 2014 of like title and inventorship, the teachings and entire contents which are incorporated herein by reference.

BACKGROUND OF THE INVENTION

1. Field of the Invention

The present invention pertains generally to a special receptacle for a magnet, and more particularly to the combination of magnet, special receptacle, and large or heavy tool such as a pneumatic tool or the like, which provides the benefit of securing the tool to a hoist or other ferromagnetic surface simply by placing the tool immediately adjacent to the hoist and releasing the tool.

2. Description of the Related Art

Modern motor vehicles have many different system, components, and assemblies, each designed optimally for a particular purpose. This has allowed these vehicles to perform many beneficial tasks at very reasonable cost, and these vehicles, with proper care and servicing, may last for many years. Owing to the complexity and large numbers of parts and components found within modern vehicles, there are an equally diverse set of fasteners and couplings that are used. This in turn means that repair has been and continues to be challenging, requiring a very large assortment of tools to properly service the vehicles. This is even more true when a variety of vehicles will be serviced.

The handling of these many diverse tools has always presented a challenge. When not in use, the tools will commonly be stored in a tool chest having many drawers, or hung upon on a wall using one of a variety of known organizers. This works well to provide accessibility to a service person starting to work on a vehicle, but does not facilitate the handling of the tools during the actual service work. Mobile carts and trays have been used heretofore, and these provide better accessibility than the tool chests or the ground around the vehicle. Unfortunately, the tool chests and trays are not nearly as mobile as the service person, and so do not offer a desired level of convenience. As a result, most service personnel will simply place tools on the ground adjacent to the work area, and then pick the tools up when needed. This leads to much extra physical effort, the particular bending over which is not well tolerated by most people.

Recognizing the need for better handling of tools and other apparatus, some artisans have developed magnetic apparatus that receive and retain ferromagnetic objects. Some of these have been developed with service tools in mind, while others are for very different industries and applications. A number of United States patents are exemplary of these, the teachings and contents which are incorporated herein by reference, including: U.S. Pat. No. 2,597,601 by Sherman, entitled "Fisherman's hatband"; U.S. Pat. No. 2,702,683 by Green et al, entitled "Magnetic holder for gasoline filling spout caps"; U.S. Pat. No. 2,733,113 by Humbargar, entitled "Holder for tools, mechanical parts, and the like"; U.S. Pat. No. 3,729,158 by Nagy, entitled "Paint can brush holder"; U.S. Pat. No. 3,886,508 by Lavrard, entitled " "; U.S. Pat. No. 4,826,059 by Bosch et al, entitled "Magnetic tool holder"; U.S. Pat. No. 5,301,822 by Coleman et al, entitled "Magnetic tool holder"; U.S. Pat. No. 5,333,767 by Anderson, entitled "Wrist mounted magnetic holder"; U.S. Pat. No. 5,544,747 by Horn, entitled "Magnetic holders for cylindrical objects"; U.S. Pat. No. 5,593,073 by Finnegan, entitled "Workman's wrist band"; U.S. Pat. No. 5,760,668 by Testa et al, entitled "Magnetic tool and object holder"; U.S. Pat. No. 6,530,508 by Devine, entitled "Utility wristband"; U.S. Pat. No. 6,587,022 by Devine, entitled "Foldable portable magnetic tool mat"; U.S. Pat. No. 7,817,002 by Fullerton et al, entitled "Correlated magnetic belt and method for using the correlated magnetic belt"; U.S. Pat. No. 8,016,255 by Lin, entitled "Portable electronic device and magnetic fixation board therefor"; U.S. Pat. No. 8,398,155 by Andochick, entitled "Vehicle cabin interior surface with embedded magnetic holder"; U.S. Pat. No. 8,516,621 by Woolery, entitled "Magnetic work clothes"; U.S. Pat. No. 8,789,821 by Wong, entitled "Tab welding bracket"; and WO03081613 by Devine, entitled "Foldable portable magnetic tool mat". While of distinct advantage over the carts and trays, these magnetic apparatus suffer from several distinct limitations. The first is whether the object to be suspended is, in fact, ferromagnetic. Plastic housings, aluminum and brass components, and similar apparatus are not ferromagnetic, and so will not remain affixed to a magnet. In addition, these supports tend to be for relatively small parts, and do not accommodate larger tools such as pneumatic wrenches and the like.

Other artisans have developed apparatus offering the ability to support tools of either ferromagnetic or other composition to ferromagnetic supports. Exemplary U.S. patents, the teachings and contents which are incorporated herein by reference, include: U.S. Pat. No. 2,939,671 by Beekman, entitled "Magnetic holder"; U.S. Pat. No. 3,100,275 by Gantz, entitled "Magnetic tool holder"; U.S. Pat. No. 4,019,047 by Frey, entitled "Trouble lamp for mechanics"; U.S. Pat. No. 5,405,004 by Vest et al, entitled "Tool and parts tray"; U.S. Pat. No. 5,568,968 by Jaramillo, entitled "Adjustable drop light apparatus"; U.S. Pat. No. 6,488,288 by Tally, entitled "Chuck key tool"; U.S. Pat. No. 6,972,654 by Brock, entitled "Armored magnetic base"; U.S. Pat. No. 7,309,140 by Huang, entitled "Light for jack"; U.S. Pat. No. 7,338,189 by Kovacik et al, entitled "LED utility light with removable magnet"; and U.S. Pat. No. 8,505,420 by Alfaro, entitled "Magnetized hand tools". Apparatuses such as these offer much more benefit than the carts and trays, and also allow tools that are not ferromagnetic to be conveniently affixed to nearby metal objects. Unfortunately, these also suffer from several drawbacks and limitations. For example, in the case of the Beekman holder, the magnet must be dimensioned to match or fit the part which will be suspended. An original equipment manufacturer can specify and obtain such magnets, meaning these are primarily only useful for OEM application, and not for use on existing and already purchased tools. Furthermore, these Beekman magnets are externally exposed. One particular intrinsic limitation of nearly all magnetic materials is that of brittleness. The Beekman magnets, which circumscribe a pneumatic line, will be readily broken if dropped onto a hard surface. There are some less powerful magnetic materials that are also less brittle, including Alnico, which is an alloy of aluminum, nickel and cobalt, and various polymer binder and magnetic powder composites. Even in the case of Alnico, a sharp impact such as when being dropped onto the floor will significantly weaken the strength of the magnet.

The Alfaro patent incorporated by reference herein above offers an alternative, providing a vinyl gripping surface as is common with many metal hand tools, and inserting between the tool and the gripping surface a plurality of magnets. The magnets provide even better gripping, while the vinyl protects the magnets. This works well for smaller and lighter tools. Unfortunately, the vinyl that protects the magnets also increases the air gap between the magnet and a ferromagnetic object that the tool is intended to be held against. According to the laws of physics governing magnetism, the strength of the magnetic field decreases as the square of the distance increases. In other words, anything that separates the magnet from the metal will decrease the holding power, and as the thickness of the separator increases, the holding power will drop off dramatically. As a result, the Alfaro patent will work effectively for smaller and lighter tools and other apparatus, but will not provide the required holding power for larger tools such as those having electric or pneumatic motors therein.

A few patents of interest adhesively attach a magnet to an object. Exemplary patents, the teachings and content which are incorporated herein by reference, include: U.S. Pat. No. 3,314,634 by Carter, entitled "Magnetic stamp kit"; and U.S. Pat. No. 5,031,874 by Shannon, entitled "Stick-on, protective magnet". As with the other patents incorporated herein by reference, these are used to couple smaller and lighter objects to ferromagnetic surfaces.

Additional patents representative of the more general knowledge of coupling various apparatus to ferromagnetic surfaces, the teachings and contents which are incorporated herein by reference, include: U.S. Pat. No. 2,268,023 by Dunn, entitled "Eraser"; U.S. Pat. No. 2,594,955 by Markowitz, entitled "Magnetic holder for pencils"; U.S. Pat. No. 2,603,530 by Jones, entitled "Visor using magnetic means for attachment"; U.S. Pat. No. 2,641,793 by Wilm, entitled "Pot holder"; U.S. Pat. No. 2,709,245 by Schneider, entitled "Electrical connections for electric appliances"; U.S. Pat. No. 2,798,241 by Cohen, entitled "Magnet carrying toothbrush"; U.S. Pat. No. 2,907,085 by Bosland, entitled "Magnetic writing device holder"; U.S. Pat. No. 2,957,596 by Rehborg, entitled "Vacuum bottles"; U.S. Pat. No. 3,046,588 by Tobolski et al, entitled "Toothbrush"; U.S. Pat. No. 3,110,917 by McPeek Jr, entitled "Chalk board eraser"; U.S. Pat. No. 3,159,372 by McIntosh, entitled "Magnetic holder for pencils or the like"; U.S. Pat. No. 4,957,266 by Ellis, entitled "Magnetized gas cap"; U.S. Pat. No. 5,000,417 by Yamada et al, entitled "Magnetic fixing member for a paper box"; U.S. Pat. No. 5,096,154 by Ellis, entitled "Magnetized gas cap"; U.S. Pat. No. 5,224,620 by Nyorkor et al, entitled "Magnetic fuel tank cap and adapter for autos and trucks"; U.S. Pat. No. 5,836,038 by Thorp, entitled "Magnetic mount dry eraser"; U.S. Pat. No. 6,305,656 by Wemyss, entitled "Magnetic coupler and various embodiments thereof"; U.S. Pat. No. 8,403,278 by Kasbohm, entitled "Magnetic portable firearm or sporting instrument holding device"; U.S. Pat. No. 8,695,935 by Kasbohm, entitled "Compact portable firearm holding device"; and U.S. Pat. No. 8,739,453 by Conner, entitled "Magnetic firearm support".

Other patents that illustrate various magnetic article supports, the teachings and contents which are incorporated herein by reference, include: U.S. Pat. No. 1,561,554 by Little, entitled "Magnetic fixture"; U.S. Pat. No. 4,506,317 by Duddy, entitled "Magnetic support for flashlight"; U.S. Pat. No. 4,985,817 by Yale, entitled "Supporting device for trouble light"; U.S. Pat. No. 5,078,281 by Johnson, entitled "Mechanic's work tray with magnetic swingable support bracket"; U.S. Pat. No. 5,577,697 by Accordino, entitled "Flashlight accessory"; U.S. Pat. No. 5,699,910 by Kubat, entitled "Mechanic's tray"; U.S. Pat. No. 6,425,560 by Dembowiak et al, entitled "Magnetic mounting object holder and hook"; U.S. Pat. No. 6,467,744 by Calin, entitled "Parts and power tool holder for lift arm"; U.S. Pat. No. 6,468,614 by LeVine et al, entitled "Apparatus for displaying paper, fabric, photographs or the like"; U.S. Pat. No. 6,793,184 by Dougal et al, entitled "Portable fishing rod holder"; and U.S. Pat. No. 7,354,023 by Wappler, entitled "Tool and part holding tray"; and U.S. Pat. No. 7,431,251 by Carnevali, entitled "Magnetic mounting platform".

As alluded to herein above, in addition to the diversity of tools required in the servicing of motor vehicles is the diversity of sizes and weights of these tools. There is a need for a variety of hand tools such as wrenches and pliers. However, and particularly in the servicing of motor vehicles, there are many fasteners and couplers which may be either very tightly secured, or may have been slightly corroded due to the exposure to the elements. There are also fasteners that may have many turns or threads required to fasten and remove parts. In any of these instances, it is common practice to use pneumatic tools such as pneumatic drivers, pneumatic impact wrenches, and the like to ease and speed up the work associated with such parts. Tools with internal motors, such as pneumatic or electric motors, tend as a group to be much heavier than many ordinary hand tools. The teachings of the prior art such as Alfaro and Beekman are inadequate to provide an adequate way to handle these heavier and more massive tools.

In addition to the patents described herein above, Webster's New Universal Unabridged Dictionary, Second Edition copyright 1983, is incorporated herein by reference in entirety for the definitions of words and terms used herein.

SUMMARY OF THE INVENTION

In a first manifestation, the invention is a tool buddy adapted to operatively support a heavy tool from a ferromagnetic support. The tool buddy includes at least one magnet. A magnet housing receives the at least one magnet therein, and defines a tray with side walls, an open face, and a bottom distal to said open face. The tray bottom has a generally cylindrically defined concave exterior surface. A compliant adhesive is affixed to the concave exterior surface, and is adapted to operatively affix the tool buddy to a pneumatic or like tool.

In a second manifestation, the invention is in combination a pneumatic tool and a tool buddy adapted to operatively support the pneumatic tool upon a vertical ferromagnetic support such as a hydraulic lift or hoist. The pneumatic tool includes a pneumatic inlet, pneumatic drive, convex body, and manual trigger. The tool buddy includes at least one magnet. A magnet housing receives the at least one magnet therein, and defines a tray with side walls, an open face, and a bottom distal to said open face. The tray bottom has a generally cylindrically defined concave exterior surface. A compliant adhesive is affixed to the concave exterior surface, and is adapted to operatively affix the tool buddy to a pneumatic or like tool.

OBJECTS OF THE INVENTION

Exemplary embodiments of the present invention solve inadequacies of the prior art by providing a molded or otherwise shaped magnet housing that supports, retains, and protects standard magnets therein. The magnet housing defines a tray with side walls and a bottom that receives the magnets therein, but which is open on one face to allow the magnets to effectively engage with a ferromagnetic support. The magnet housing has a generally cylindrically defined concave surface distal to the open face which is cooperative with the curved housing used on most pneumatically or electrically powered tools to nest therewith. To affix the tool buddy to the tool housing, a very high bond double-sided adhesive that adheres on one surface to the magnet housing concave face and on the opposed surface to the tool.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide a magnetic tool support capable of supporting pneumatic tools such as an impact wrench or the like upon a hoist or other ferromagnetic surface. A second object of the invention is to provide a magnet housing that simultaneously protects the magnet and couples the magnet to the tool. Another object of the present invention is to provide a magnetic tool support that does not creep or slip relative to the tool A further object of the invention is to provide an intuitive package that may be readily used to retrofit existing tools. Yet another object of the present invention is to combine substantial tool holding strength with an intuitive design that is user-friendly and easy to incorporate with a variety of existing tools. A further object of the invention is to provide a non-slip surface, ensuring a tool will stay in place and not slide down a sloped or vertical surface. An additional object of the invention is to allow the tool buddy to be removed at any desired time, without harm or the need to deface the tool.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Manifested in the preferred embodiment, the present invention provides a tool buddy that supports, retains, and protects standard magnets and secures the magnets to a curved housing used on most pneumatically or electrically powered tools. A very high bond double-sided adhesive adheres on one surface to a magnet housing concave face and on the opposed surface to the tool.

Various embodiments of apparatus designed in accord with the present invention have been illustrated in the various figures and are described in more detail herein below. The embodiments are distinguished by the hundreds digit, and various components within each embodiment designated by the ones and tens digits. However, many of the components are alike or similar between embodiments, so numbering of the ones and tens digits have been maintained wherever possible, such that identical, like or similar functions may more readily be identified between the embodiments. If not otherwise expressed, those skilled in the art will readily recognize the similarities and understand that in many cases like numbered ones and tens digit components may be substituted from one embodiment to another in accord with the present teachings, except where such substitution would otherwise destroy operation of the embodiment. Consequently, those skilled in the art will readily determine the function and operation of many of the components illustrated herein without unnecessary additional description. Furthermore, not all of the components are numbered in all of the drawing figures, to aid in the clarity and understanding of the drawings. Whether numbered or not, it will be understood that when referenced in the text, the components are so provided in a particular embodiment.

Figure 1:
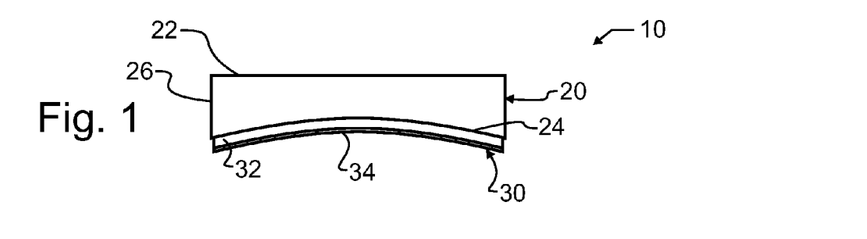
FIG. 1 illustrates a preferred embodiment tool buddy designed in accord with the teachings of the present invention from a side elevational view.
Figure 2:
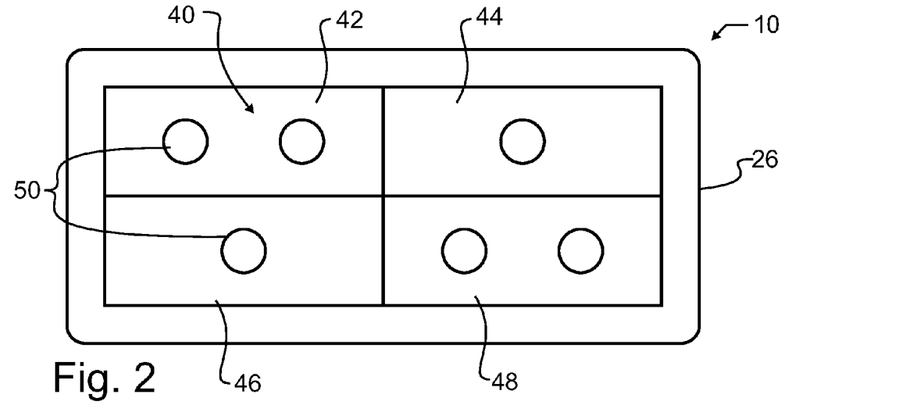
FIG. 2 illustrates the preferred embodiment tool buddy of FIG. 1 from a top plan view.

A preferred embodiment tool buddy 10 is illustrated in FIGS. 1 and 2. A molded or otherwise shaped magnet housing 20 supports, retains, and protects standard magnets 40 therein. Magnet housing 20 defines a tray with side walls 26 and a bottom 21 that receives magnets 40 therein, but which is open on one face 22 to allow magnets 40 to effectively engage with a ferromagnetic support such as a hoist, motor vehicle component, other machine, or other support. Magnet housing 20 has a generally cylindrically defined concave surface 24 distal to open face 22 which is cooperative with the curved housing used on most pneumatically or electrically powered tools to nest therewith. To affix tool buddy 10 to the tool housing, a very high bond double-sided adhesive 30 adheres on one surface to the magnet housing concave surface 24 and on the opposed surface to a convex surface of the tool.

The bottom 21 of magnet housing 20 used in preferred embodiment tool buddy 10 is preferably sufficiently strong as to provide an opposed surface to which rivets 50 may be affixed. Rivets 50 are used to secure magnets 42, 44, 46, 48 into magnet housing 20. The use of four magnets, or any particular number of magnets greater than one within magnet housing 20 is not critical to the operation of the present invention, but is preferred, since the use of more than one magnet allows alternating polarities of magnets. The provision of alternating polarities is beneficial for several reasons. First of all, the holding power of the magnet assembly is increased when placed into direct contact with a ferromagnetic object, thereby allowing a lower profile magnet assembly 40 to be used within preferred embodiment tool buddy 10, which in turn means there is less interference from preferred embodiment tool buddy 10 when the tool is being used or stored.

Figure 3:
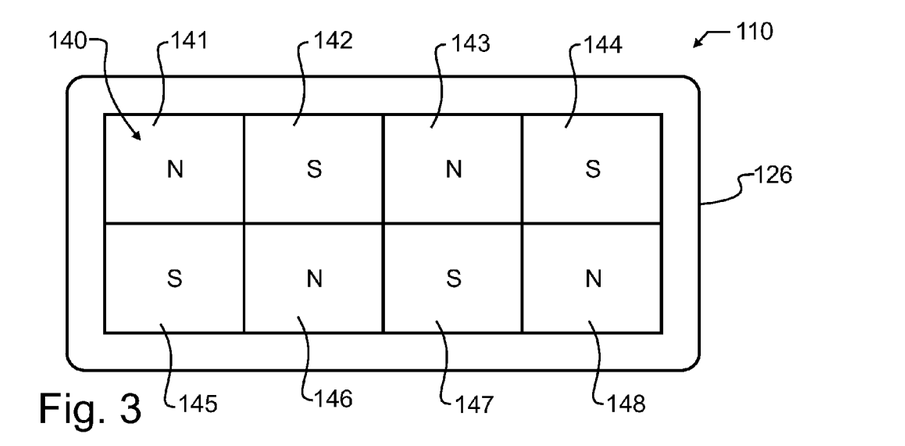
FIG. 3 illustrates a first alternative embodiment tool buddy designed in accord with the teachings of the present invention from a top plan view.
Figure 4:
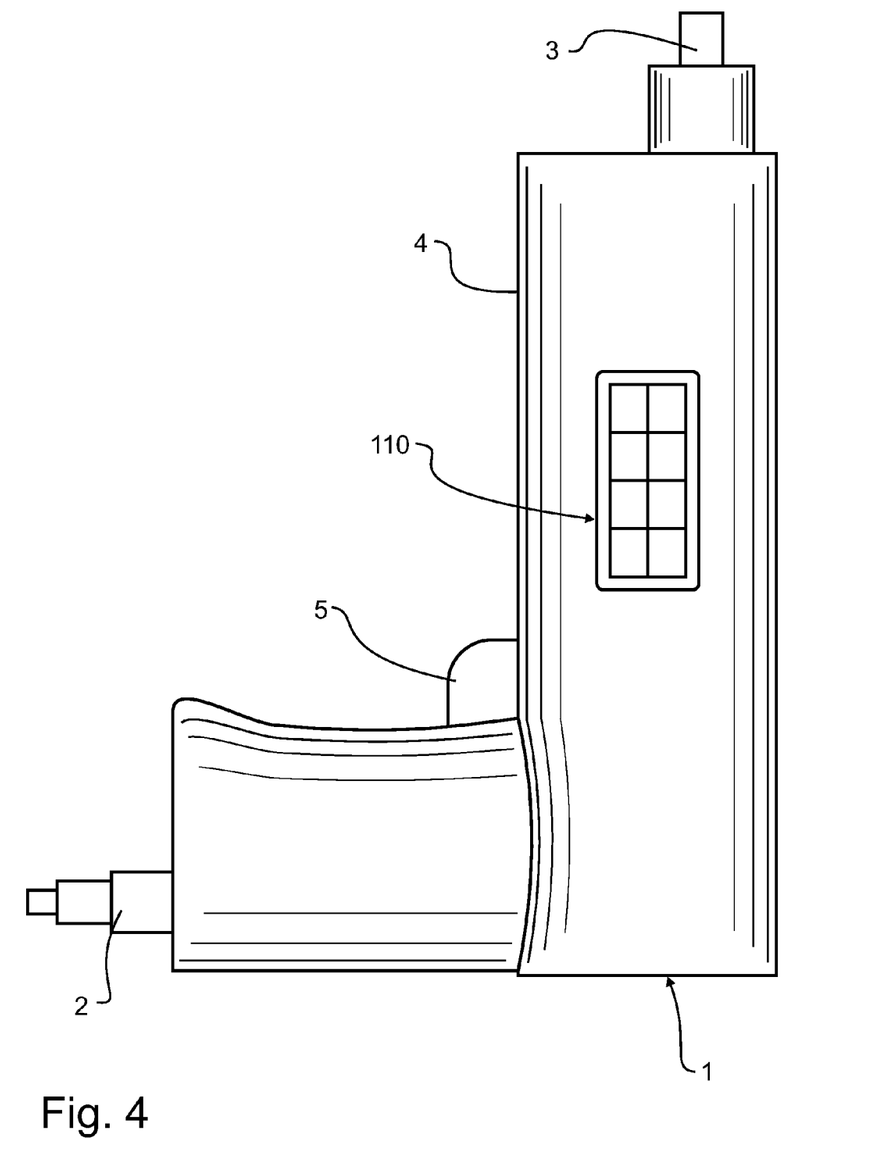
FIG. 4 illustrates the first alternative embodiment tool buddy of FIG. 3 from a top plan view in further combination with an exemplary prior art pneumatic tool.

FIG. 3 illustrates a first alternative embodiment tool buddy 110 that has a magnet assembly 140 incorporating eight magnets 141-148 in alternating polarity, resembling a checkerboard pattern. FIG. 4 illustrates this first alternative embodiment tool buddy 110 in further combination with an exemplary prior art pneumatic tool 1. For illustrative purposes, pneumatic tool 1 may have a pneumatic inlet 2. As will be understood herein, while the present invention is disclosed and illustrated in association with a pneumatic tool having a pneumatic source and pneumatic motor, other similar tools are contemplated herein, and may for exemplary purposes include an electric tool such as a drill or impact driver using an electric motor and electric cord. Nevertheless, electricity posses much danger, particularly in the presence of volatile compounds used within and in the servicing of motor vehicles, so it will be appreciated that pneumatic tools are much preferred in the industry. Exemplary prior art pneumatic tool 1 will include a drive 3 to which sockets or other tools may be attached. A convex body 4 encompasses the pneumatic motor, and a manual trigger 5 is provided to control the flow of air into the pneumatic motor.

Tool buddy 110 is securely and semi-permanently affixed to convex body 4 through the adhesion of very high bond double-sided adhesive 130, after release tape 134 has been removed therefrom. A number of factors in the present invention interact in complex manner to enable the present invention to be effective in magnetically supporting these pneumatic tools from a hoist or the like where the prior art patents incorporated herein above were unsuccessful.

One very important feature is the concave surface 124 (24, 124, 224, 324, 424), which allows convex body 4 to nest therein. As may be appreciated, pneumatic tools from different manufacturers have different dimensions, and so there is not a single arc, geometry, or even surface texture that is common amongst each tool. Instead, concave surface 124 will accommodate a range of geometries, and this accommodation comes, in part, from the particular use of very high bond double-sided adhesive 30. In the preferred and alternative embodiments illustrated herein, very high bond double-sided adhesive 30 is a thin and strong foam core tape. The particular composition is not critical to the present invention, or even that the core be foam, but instead that the core be compliant or resilient to a limited extent, and still durable enough to support the load of these heavy tools.

The needed compliance will provided two benefits of importance. The first and perhaps more obvious is to accommodate slightly different curvatures found in different convex bodies 4. However, in addition, this compliance or resilience protects magnet assembly 40 as well, in the event of an unfortunate drop of tool 1 to the ground. Such a drop will not, of course, occur when tool 1 is being suspended by tool buddy 110. Instead, during use service personnel may infrequently and accidentally drop pneumatic tool 1. Such an impact could destroy magnet assembly 40, but the foam or otherwise resilient core 32 and side walls 26 of magnet housing 20 will in combination provide substantial protection against all but the most unfortunate of impacts. Noteworthy here is the brittleness of most magnetic compositions, as already described herein above.

The provision of sidewalls 126 of approximately the same elevation adjacent to open face 122, and the fabrication of magnet housing 120 from a suitable material, will similarly provide protection to the sharp and brittle edges of magnet assembly 40 when tool buddy 110 is being placed onto a hoist or the like. If the open face 122 is not parallel with the hoist surface, then instead of the sharp and brittle magnet edge contacting the hoist, side walls 126 will make contact. As the open face 22 is brought parallel and adjacent to the hoist, then the large surface area of magnet assembly 140 will absorb the energy of contact, once again protecting magnet assembly 140 from harm. Consequently, materials such as high durometer rubber, plastic, aluminum and other suitable materials are contemplated herein.

Many polymers and adhesives are known to "cold creep" or flow when placed under load for an extended period. One example of when such flow might occur is when pneumatic tool 1 is suspended from a hoist overnight, thereby placing a heavy load upon tool buddy 110. However, the nesting of convex body 4 within concave surface 124 provides yet another benefit. As illustrated in the drawings, tool buddy 110 is substantially longer along the axis of curvature of concave surface 124 than transverse thereto. In the view of FIGS. 3 and 4, this is illustrated as being a difference of about a factor of two. If pneumatic tool 1 is suspended such that the longitudinal direction of convex body 4 is horizontal to the ground, then if foam core 132 cold flows, convex body 4 will simply get closer on one side to concave surface 124, and will be limited thereby. If pneumatic tool 1 is suspended such that the longitudinal direction of convex body 4 is vertical to the ground, then there is twice as much foam core 132, reducing the extent of cold flow. Finally, if pneumatic tool 1 is suspended such that the longitudinal direction of convex body 4 is at some angle intermediate between horizontal and vertical to the ground, then if foam core 132 cold flows, convex body 4 will simply get closer on one side to concave surface 124, and will be limited thereby.

In after installation of tool buddy 110 onto pneumatic tool 1, a person should elect to remove tool buddy 110 therefrom, a small amount of heat such as from a hair drier or hot air gun may be applied to and about tool buddy 110, which will cause a softening of the very high bond adhesive, and allow tool buddy 110 to be removed therefrom without defacing pneumatic tool 1. Alternatively, sufficient mechanical force may be applied to break or destroy foam core 32, and any remaining residue may be scraped or removed with suitable solvent.

Figure 5:
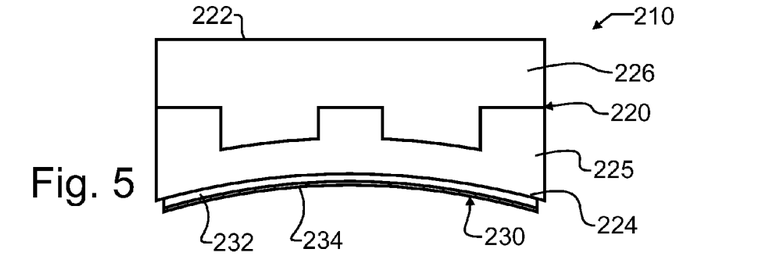
FIG. 5 illustrates a second alternative embodiment tool buddy designed in accord with the teachings of the present invention from a side elevational view.
Figure 6:
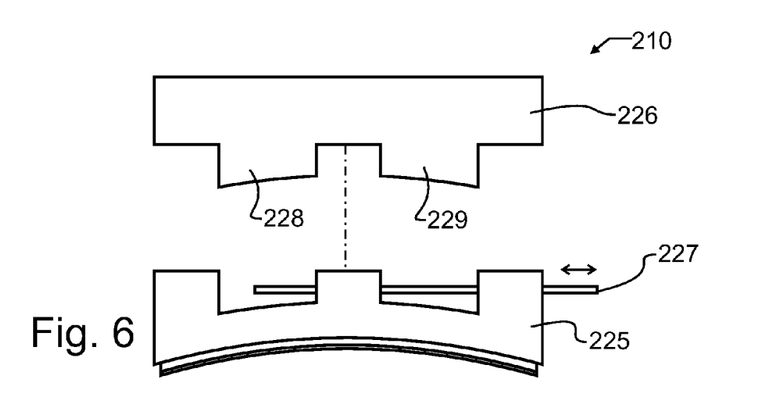
FIG. 6 illustrates the second alternative embodiment tool buddy of FIG. 5 from a side elevational and exploded view.
Figure 7:
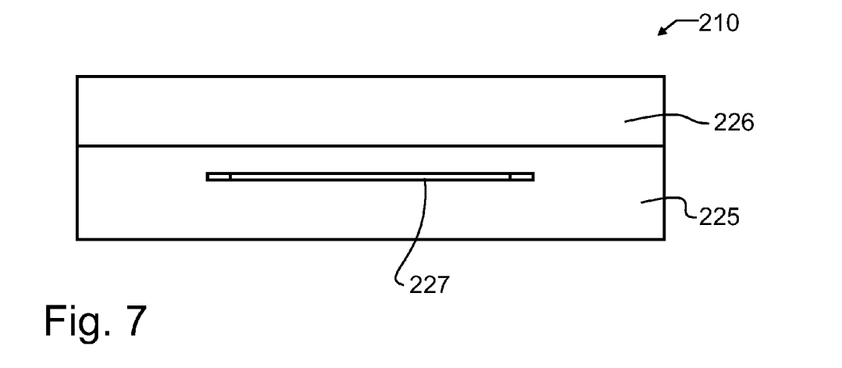
FIG. 7 illustrates the second alternative embodiment tool buddy of FIG. 5 from a front elevational view.
Figure 11:
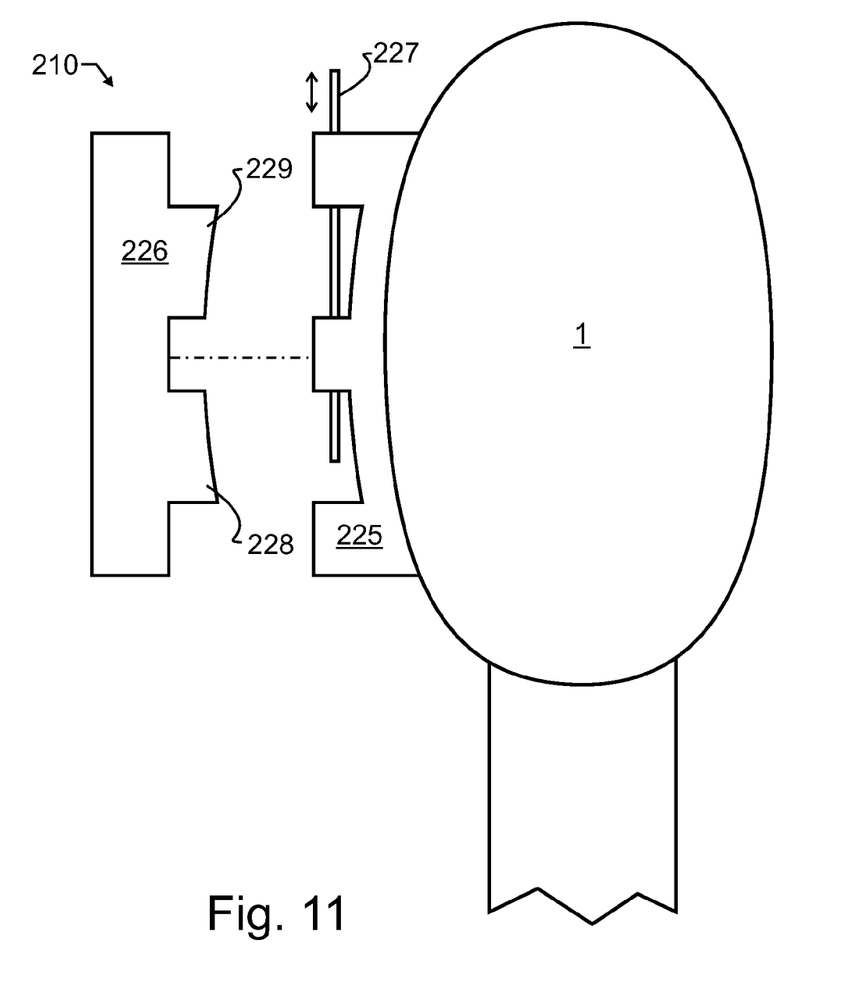
FIG. 11 illustrates a fifth alternative embodiment tool buddy designed in accord with the teachings of the present invention from a side elevational view.

FIGS. 5-7 illustrate a second alternative embodiment tool buddy 210. In this embodiment, magnet housing 220 has been modified to be a two part housing. An upper part (in the direction of the illustration) includes side walls 226 that have two parallel ridges 228, 229. These drop down into a corresponding pair of grooves in side wall lower member 225. The two side wall members 225, 226 are secured together using a U-shaped pin 227 that slides through aligned holes in side wall lower member 225 and side wall member 226. This allows the tray portion of magnet housing 220, which is comprised by side walls 226, to be provided as an optional feature on OEM equipment, provided the OEM equipment is provided with side wall lower member 225 affixed, integral with, or unitary to pneumatic tool 1. FIG. 11 illustrates an alternative embodiment illustrating one OEM implementation, where side wall lower member 225 is formed unitarily with pneumatic tool 1.

While a U-shaped pin 227 is illustrated as the preferred apparatus to couple side wall lower member 225 and side wall member 226 together, alternatives that would be understood by those reasonably skilled in the mechanical arts will be considered to be incorporated herein as well. As but one exemplary but non-limiting example, features that form an interlock between side wall lower member 225 and side wall member 226 may be provided. These may include a dovetail construction, or may alternatively include various opposed protrusions and indents, or any other suitable technique.

Figure 8:
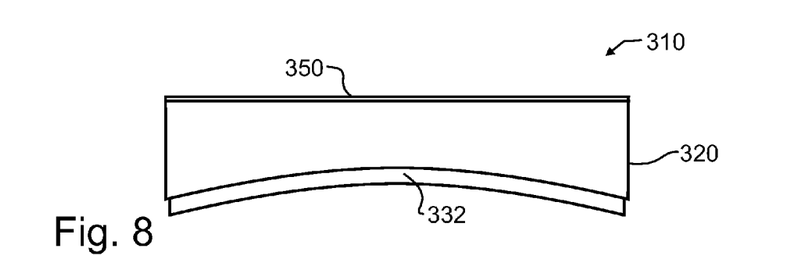
FIG. 8 illustrates a third alternative embodiment tool buddy designed in accord with the teachings of the present invention from a side elevational view.
Figure 9:
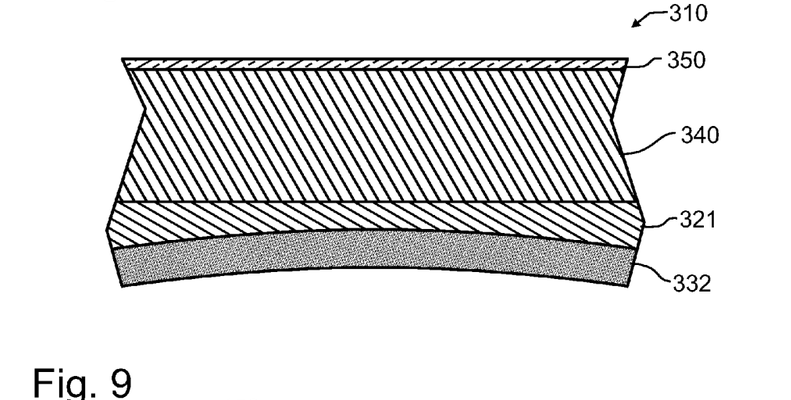
FIG. 9 illustrates the third alternative embodiment tool buddy of FIG. 8 from a sectional view taken along a vertical plane parallel to the side visible in FIG. 8.
Figure 10:
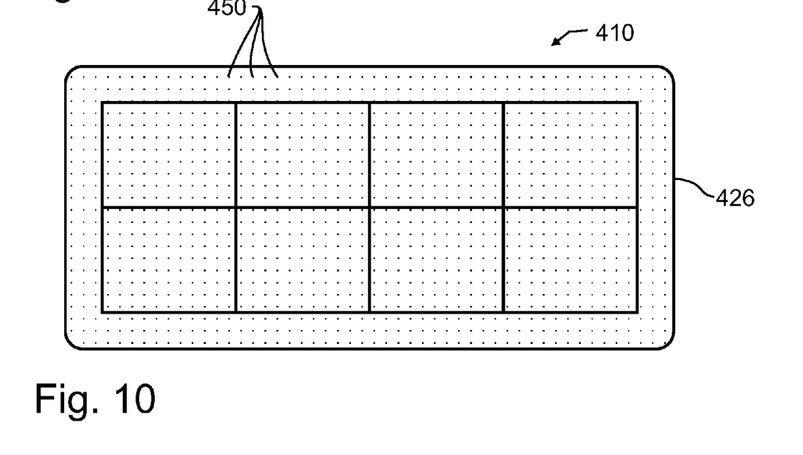
FIG. 10 illustrates a fourth alternative embodiment tool buddy designed in accord with the teachings of the present invention from a top plan view.

FIGS. 8-9 illustrate a third alternative embodiment tool buddy 310. In this embodiment, a very thin rubber or otherwise high-friction layer 350 is preferably provided on top of either or both of magnet assembly 340 and side walls 326. One challenge with the suspension of a heavy tool such as pneumatic tool 1 from a relatively smooth vertical surface is the tendency for a magnet to slide across the steel. This can be particularly true in the presence of oil, grease or the like. By providing a thin layer of higher co-efficient material, in the event of some slippage, the leading edge of high-friction layer 350 will act as a scraper, removing the oil and allowing the major exposed surface of high-friction layer 350 to hold against the hoist. High-friction layer 350 may be provided with any suitable finish or texture, including ribs or the like. One preferred embodiment of high-friction layer is illustrated in FIG. 10, which illustrates a fourth alternative embodiment tool buddy 410 extremely similar to 310. In this case, rather than a continuous layer 350, a plurality of very fine spots or dots 450 are provided. These spots 450 will tend to displace any oil, and yet can be extremely thin, thereby reducing the separation of magnet assembly 400 from a ferromagnetic object.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:

1. A tool buddy adapted to operatively support a heavy tool from a ferromagnetic support, comprising:
   at least one magnet;
   a magnet housing receiving said at least one magnet therein and defining a tray with side walls, an open face, and a bottom distal to said open face, said bottom having a generally cylindrically defined concave exterior surface; and
   a compliant adhesive affixed to said concave exterior surface;
   wherein said magnet housing further comprises a separable two part assembly having a side wall upper part including side walls and a coupler, and a side wall lower member, said side wall upper part separable from said side wall lower member.

2. The tool buddy of claim 1, wherein said magnet housing side walls and said at least one magnet terminate substantially in a common plane defining said open face.

3. The tool buddy of claim 1, wherein said compliant adhesive further comprises a very high bond double-sided adhesive that is adapted to operatively adhere on a first surface to said magnet housing concave face and on a second opposed surface to said heavy tool.

4. The tool buddy of claim 1, wherein said at least one magnet further comprises an array of alternating polarity magnets.

5. The tool buddy of claim 1, further comprising a thin high-friction layer affixed adjacent to said open face.

6. The tool buddy of claim 1, further comprising a plurality of friction-inducing spots applied to said open face.

7. The tool buddy of claim 1, wherein said magnet housing coupler further comprises parallel ridges in said side wall upper part and corresponding grooves in said side wall lower member.

8. The tool buddy of claim 7, further comprising a removable pin securing said parallel ridges within said corresponding grooves.

9. The tool buddy of claim 1, wherein said magnet housing coupler further comprises cooperative protrusions and indentations.

10. In combination, a pneumatic tool having and a tool buddy adapted to operatively support the pneumatic tool upon a ferromagnetic support,
    said pneumatic tool having:
       a pneumatic inlet,
       a pneumatic drive,
       a convex body, and
       a manual trigger;
    said tool buddy having:
       at least one magnet;
       a magnet housing receiving said at least one magnet therein and defining a tray with side walls, an open face, and a bottom distal to said open face, said bottom having a generally cylindrically defined concave exterior surface; and
       a compliant adhesive affixed to said concave exterior surface and to said pneumatic tool convex body;
       wherein said magnet housing further comprises a separable two part assembly having a side wall upper part including side walls and a coupler, and a side wall lower member, said side wall upper part separable from said side wall lower member.

11. The combination pneumatic tool and tool buddy of claim 10, wherein said magnet housing side walls and said at least one magnet terminate substantially in a common plane defining said open face.

12. The combination pneumatic tool and tool buddy of claim 10, wherein said compliant adhesive further comprises a very high bond double-sided adhesive that is adapted to operatively adhere on a first surface to said magnet housing concave face and on a second opposed surface to said heavy tool.

13. The combination pneumatic tool and tool buddy of claim 10, wherein said at least one magnet further comprises an array of alternating polarity magnets.

14. The combination pneumatic tool and tool buddy of claim 10, further comprising a thin high-friction layer affixed adjacent to said open face.

15. The combination pneumatic tool and tool buddy of claim 10, further comprising a plurality of friction-inducing spots applied to said open face.

16. The combination pneumatic tool and tool buddy of claim 10, wherein said magnet housing coupler further comprises parallel ridges in said side wall upper part and corresponding grooves in said side wall lower member.

17. The combination pneumatic tool and tool buddy of claim 16, further comprising a removable pin securing said parallel ridges within said corresponding grooves.

18. The combination pneumatic tool and tool buddy of claim 10, wherein said magnet housing coupler further comprises cooperative protrusions and indentations.

* * * * *